United States Patent [19]
Sweet et al.

[11] Patent Number: 5,881,636
[45] Date of Patent: Mar. 16, 1999

[54] HEAT IMPINGEMENT BAKE OVEN

[76] Inventors: Dan Sweet; Sheila K. Sweet, both of 2618 Poplar Ridge, Bethel, Ohio 45106

[21] Appl. No.: 108,653

[22] Filed: Jul. 1, 1998

[51] Int. Cl.[6] ............................ A21B 1/00; A21B 1/08; A23L 3/00; H05B 6/64
[52] U.S. Cl. ........................ 99/443 C; 99/386; 99/479; 99/476; 126/19 R; 126/21 A; 432/121; 432/133; 432/145; 432/152
[58] Field of Search .............. 99/468, 473–477, 99/386, 479, 443 C, 443 R, 326–331, 352, 355; 34/72, 211–215; 126/19 R, 21 A, 299 D, 20, 20.1; 219/396, 394, 388, 478, 697, 413, 700, 400; 312/236; 432/152, 120, 145, 128, 247, 121, 133; 426/509, 523

[56] References Cited

U.S. PATENT DOCUMENTS

| | | |
|---|---|---|
| 3,677,171 | 7/1972 | Le Van . |
| 4,262,586 | 4/1981 | Miller et al. . |
| 4,363,263 | 12/1982 | Williams ................................... 99/352 |
| 4,377,109 | 3/1983 | Brown et al. . |
| 4,544,352 | 10/1985 | Lanham et al. . |
| 4,631,029 | 12/1986 | Lanham et al. ........................ 432/133 |
| 4,726,766 | 2/1988 | Stewart et al. ........................ 126/21 A |
| 4,745,854 | 5/1988 | Buckley . |
| 4,750,416 | 6/1988 | Graham ..................................... 99/476 |
| 4,882,981 | 11/1989 | Bacigalupe et al. ...................... 99/479 |
| 4,951,648 | 8/1990 | Shukla et al. . |
| 4,964,392 | 10/1990 | Bruno et al. . |
| 5,010,808 | 4/1991 | Lanham ................................ 99/443 C |
| 5,030,809 | 7/1991 | Buday . |
| 5,078,120 | 1/1992 | Hwang .................................... 126/21 A |
| 5,111,929 | 5/1992 | Pierick et al. ......................... 99/443 C |
| 5,205,135 | 4/1993 | Lang ...................................... 99/517 X |
| 5,298,707 | 3/1994 | Sprecher et al. . |
| 5,322,007 | 6/1994 | Caridis et al. ......................... 99/386 X |
| 5,335,590 | 8/1994 | Crump, III et al. ....................... 99/479 |
| 5,441,035 | 8/1995 | Liang-Chich . |
| 5,473,975 | 12/1995 | Bruno et al. . |
| 5,515,775 | 5/1996 | Williams ............................... 99/476 X |
| 5,702,245 | 12/1997 | London ................................. 99/355 X |

OTHER PUBLICATIONS

"Machine Design", Feb. 19, 1988, pp. 46, 48.

*Primary Examiner*—Timothy F. Simone
*Attorney, Agent, or Firm*—Chase & Yakimo, L.C.

[57] ABSTRACT

An oven for baking food products includes a spiral conveyor having a wire mesh conveyor belt for transporting food products from a loading bin to a storage bin. The spiral conveyor is surrounded by a threaded cylindrical housing having apertures which communicate with the loading bin, heat source, plenum, and recirculation fan. Heated air is blown into the threaded housing such that a downward spiral or vortex of air is created which envelops the food products upon the spiral conveyor belt for efficient baking. The housing is partially removable for cleaning or maintenance of the conveyor. Heated air within the housing is drawn about the food products as it is suctioned into a recirculation tube for distribution to the storage bin and to the plenum for recirculation through the housing. In addition, the loading bin is mounted upon a vibration device such that food products are evenly distributed upon entry to the spiral conveyor.

23 Claims, 11 Drawing Sheets

HEAT IMPINGEMENT BAKE OVEN

BACKGROUND OF THE INVENTION

This invention relates generally to bake ovens and, more particularly, to a bake oven having a spiral conveyor system surrounded by a threaded housing for baking food products by forcing a vortex of hot air through the conveyor system.

Many people desire an alternative to fast food products which are typically immersed in a heated vat and thus are saturated with cooking oils. Products prepared in this manner are typically high in cholesterol and fat. Accordingly, several devices for baking food products have been proposed in the prior art.

Although assumably effective in operation, such known devices are relatively inefficient for use in baking the typically fried fast food products such as french fries, potato wedges, tater tots, and other products which must be prepared quickly. More particularly, existing conveyor-type ovens either have an open ended construction which allows significant heat loss or utilize air impingement technology. Air impingement systems cook food by forcing jets of hot air toward the top and bottom of the food product, causing the air to rebound and create turbulence which slows cooking. These constructions and methodologies increase the time and energy required to cook food products.

Accordingly, it is desirable to have an oven which can bake food products quickly and efficiently without the use of cooking oils or other undesirable ingredients. It is further desirable to have an oven which utilizes recirculated heated air both for baking and maintaining the warmth of already prepared food products.

SUMMARY OF THE INVENTION

In response thereto, we have invented a bake oven which utilizes a spiral conveyor assembly for carrying food products from a loading bin to a storage bin. The oven includes conventional electrical heating elements and a blower which transmits hot air downward through the conveyor assembly. The conveyor proper includes a wire mesh conveyor belt through which heated air may pass so as to efficiently heat both sides of a food product. The spiral conveyor assembly is enclosed within a threaded cylindrical housing which causes a vortex of heated air to envelops food products resting upon the conveyor. The vortex of heated air enhances the speed and completeness of baking by quickly surrounding the food products and thus speeding heat penetration. A suction device further enhances baking efficiency by pulling heated air from the top of the food product to the bottom and then into the suction tube. Air pulled into the suction tube is circulated in part to the storage bin to maintain the warmth of prepared food products and also to the heat chamber for recirculation into the conveyor assembly. The internal moisture of each food product is maintained therein as a result of the speed in which the product is cooked using the vortex and suction methods of air transfer.

The housing also serves to prevent the inefficiencies experienced by existing bake ovens, including heat loss, air turbulence, and air volume loss. In addition, the housing is partially removable for easy cleaning or maintenance of the conveyor assembly. Food products are loaded into the oven through a drawer which deposits the products into a loading bin for delivery to the conveyor assembly. The loading bin is mounted upon a vibration device which causes the food products to more evenly enter the conveyor assembly. Complete cooking of each product is thus enhanced.

It is therefore a general object of this invention to provide an oven which can quickly and efficiently bake food products.

Another object of this invention is to provide an oven, as aforesaid, having a conveyor system for moving food products from a loading bin to a storage bin.

Still another object of this invention is to provide an oven, as aforesaid, which can bake food products by forcing a vortex of heated air about the spiral conveyor.

Yet another object of this invention is to provide an oven, as aforesaid, which recirculates heated air between a heat chamber and conveyor assembly.

A further object of this invention is to provide an oven, as aforesaid, which can maintain the warmth of prepared food products using the recirculating heated air.

A still further object of this invention is to provide an oven, as aforesaid, which can evenly transfer food products from a loading bin to a conveyor assembly.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
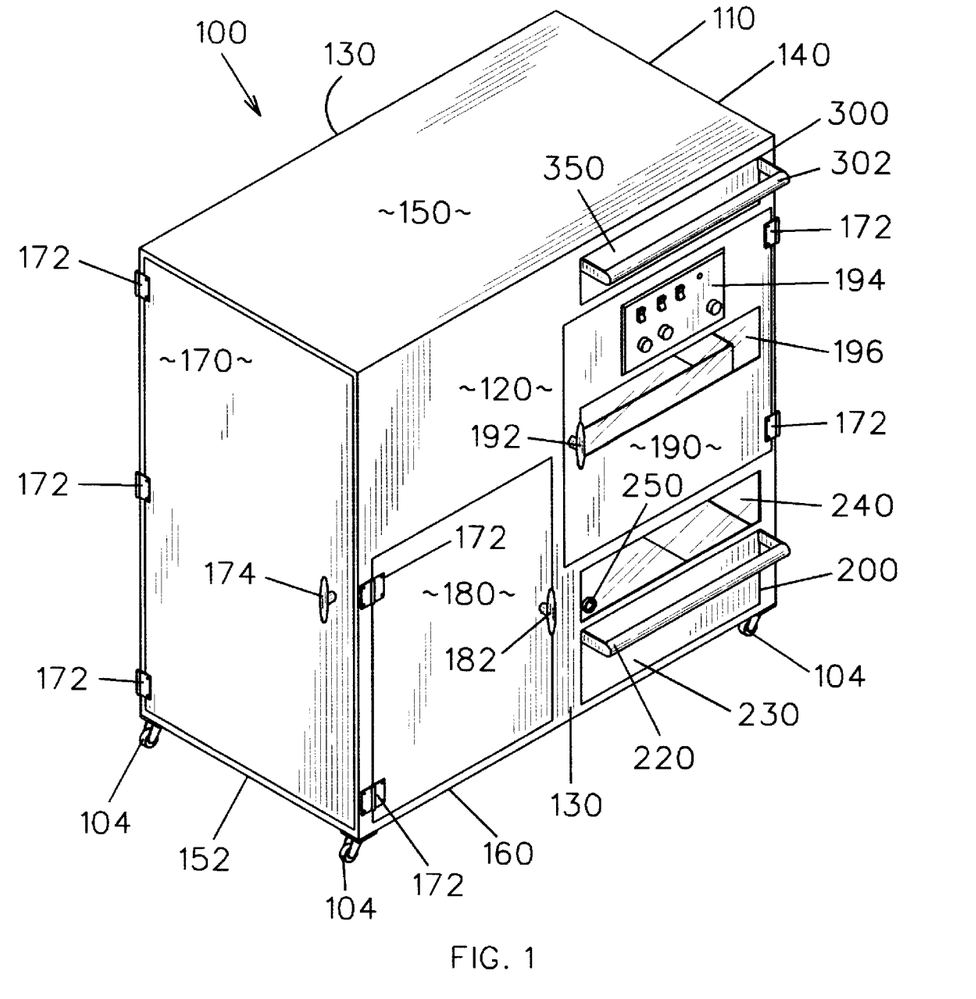
FIG. 1 is a perspective view of the oven of the present invention.
Figure 2:
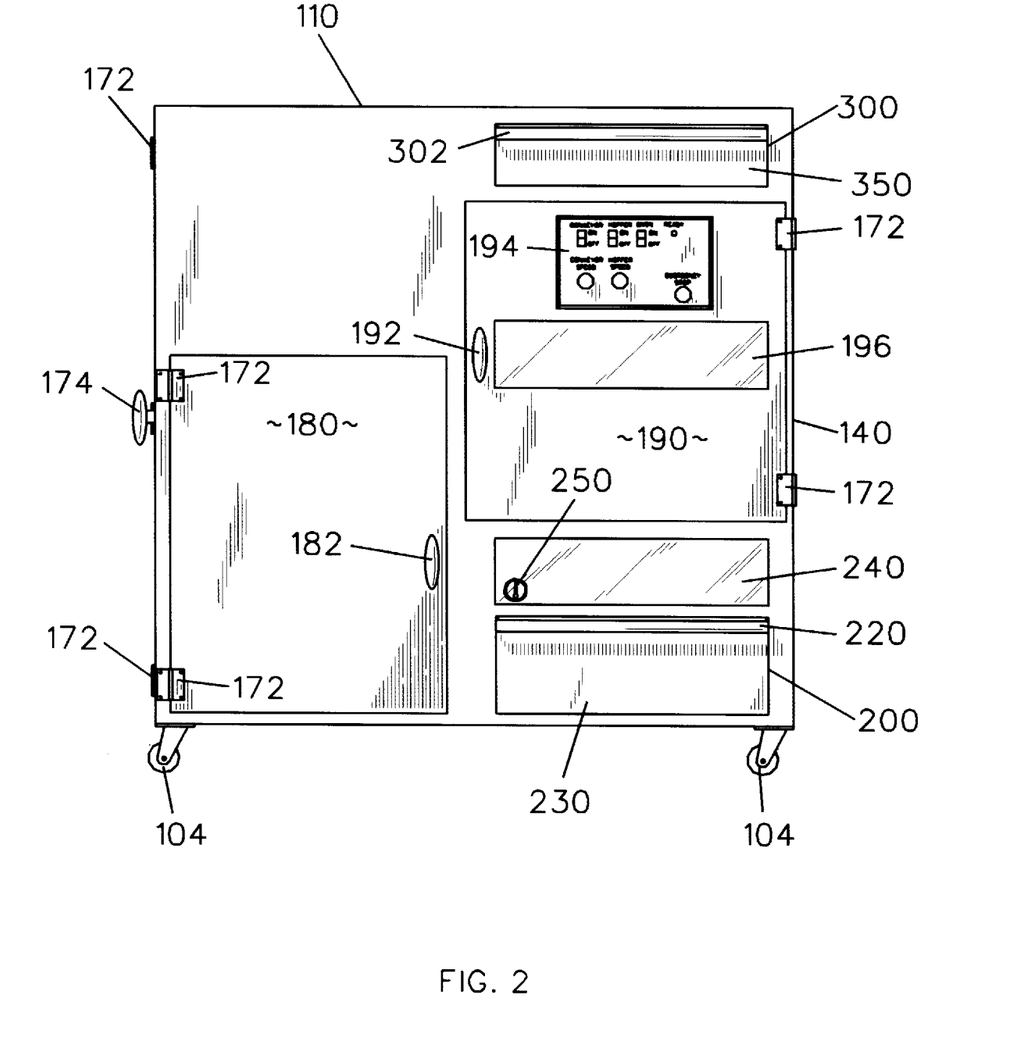
FIG. 2 is a front view of the oven of FIG. 1.
Figure 4:
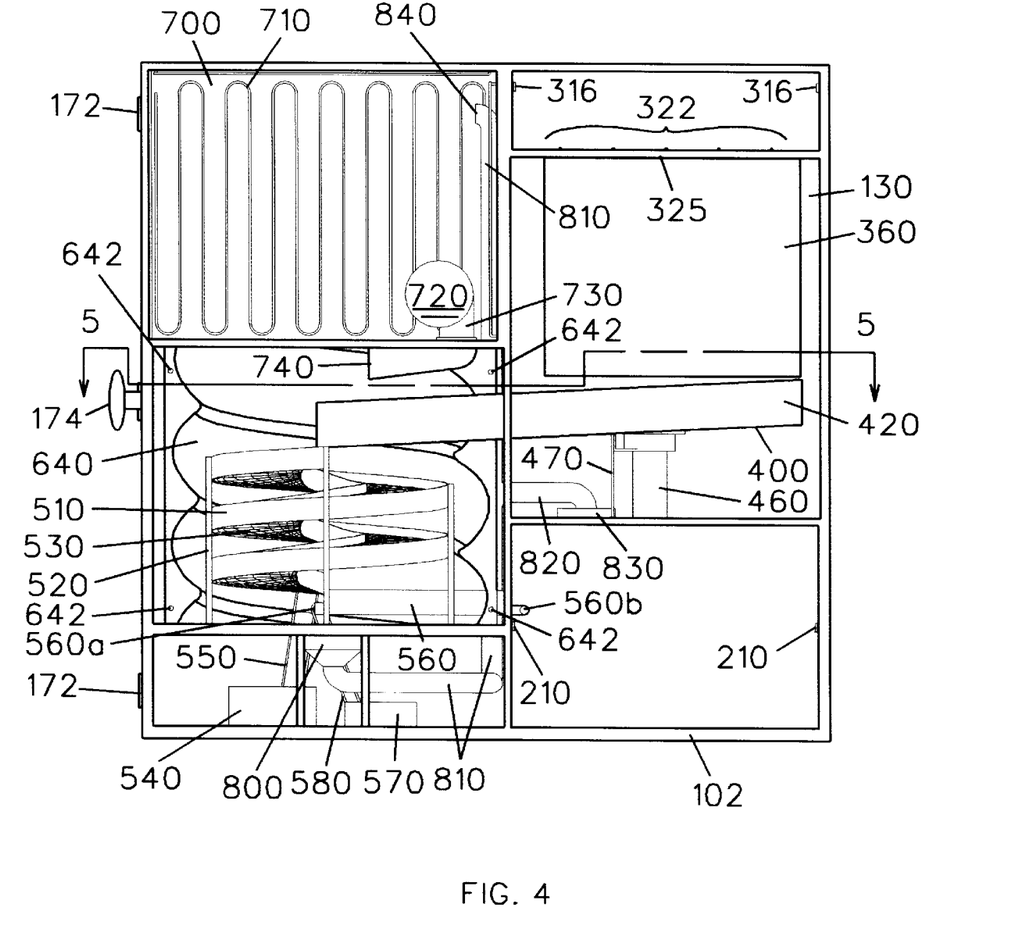
FIG. 4 is a front view of the oven of FIG. 3 with the front portion of the housing for the spiral conveyor removed.
Figure 5:
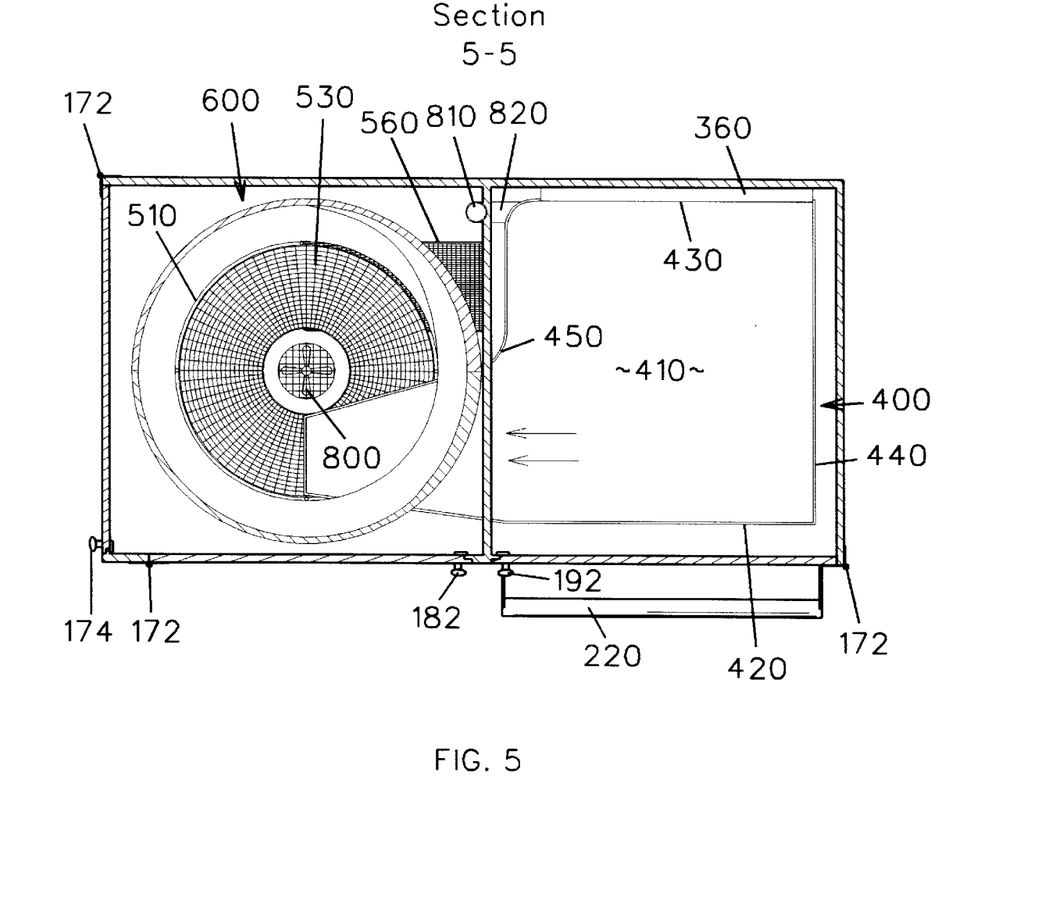
FIG. 5 is a top sectional view of the oven of FIG. 4 taken along plane 5—5 in FIG. 4.
Figure 6:
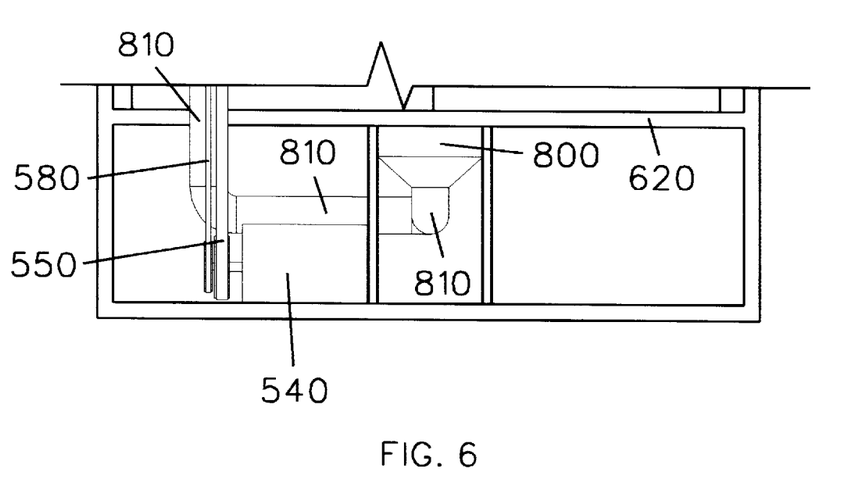
FIG. 6 is a partial left side view of the oven of FIG. 3 with the left side panel removed.

Turning more particularly to the drawings, FIGS. 1 and 2 show a bake oven 100 having a generally rectangular housing 110, the housing 110 comprising parallel front and rear panels 120, 130 normally attached to oppositely disposed top and bottom panels 150, 160 (See also FIGS. 4 and 5). Castor wheels 104 support the housing 110 and facilitate easy repositioning thereof. The housing 110 further includes a right side panel 140 intermediate the front and rear panels 120, 130. The panels are further fixedly attached to an interior frame structure 102. The housing 110 further includes a first access door 170 mounted to the opposed side panel frame 152 with hinges 172, the door completely enclosing the left side of the oven 100 when in its closed position (FIG. 1). The door 170 includes a handle 174 fixedly attached thereto for maneuvering the door between open and closed positions.

A second access door 180 is mounted on the front panel 120 of the housing 110 using hinges 172, the door 180 having a handle 182 fixedly attached thereto. The second door 180 is appropriately disposed so as to provide access to the conveyor assembly 500 and housing 600 to be described later. A third access door 190 is hingedly mounted to the front panel 120 so as to provide access to a loading bin 400, the door 190 having a handle 192 fixedly attached thereto for maneuvering the door. The third access door 190 further includes a control panel 194 by which oven parameters such as temperature and conveyor speed can be manipulated by a user. The third access door also presents a window 196 through which a user can monitor the function of the loading bin 400.

The oven 100 includes a storage bin 200 in the form of a drawer which is slidably received through an opening in the front panel 120 adjacent the lower edge 130 thereof. The storage bin 200 includes side walls having outwardly extending edges similar to 314 of drawer 300 which are slidable over rollers 210 (FIG. 3) rotatably mounted to the frame structure 102 within the opening in the front panel 120. A handle 220 is integrally attached to the front side 230 of the bin 200 which allows a user to urge the bin 200 into or out of the oven 100. A window 240 is presented in the front panel 120 upwardly adjacent the storage bin 200 such that a user can view food products stored therein. A thermometer 250 is mounted within the storage bin environment and is viewable through the window 240.

Figure 8:
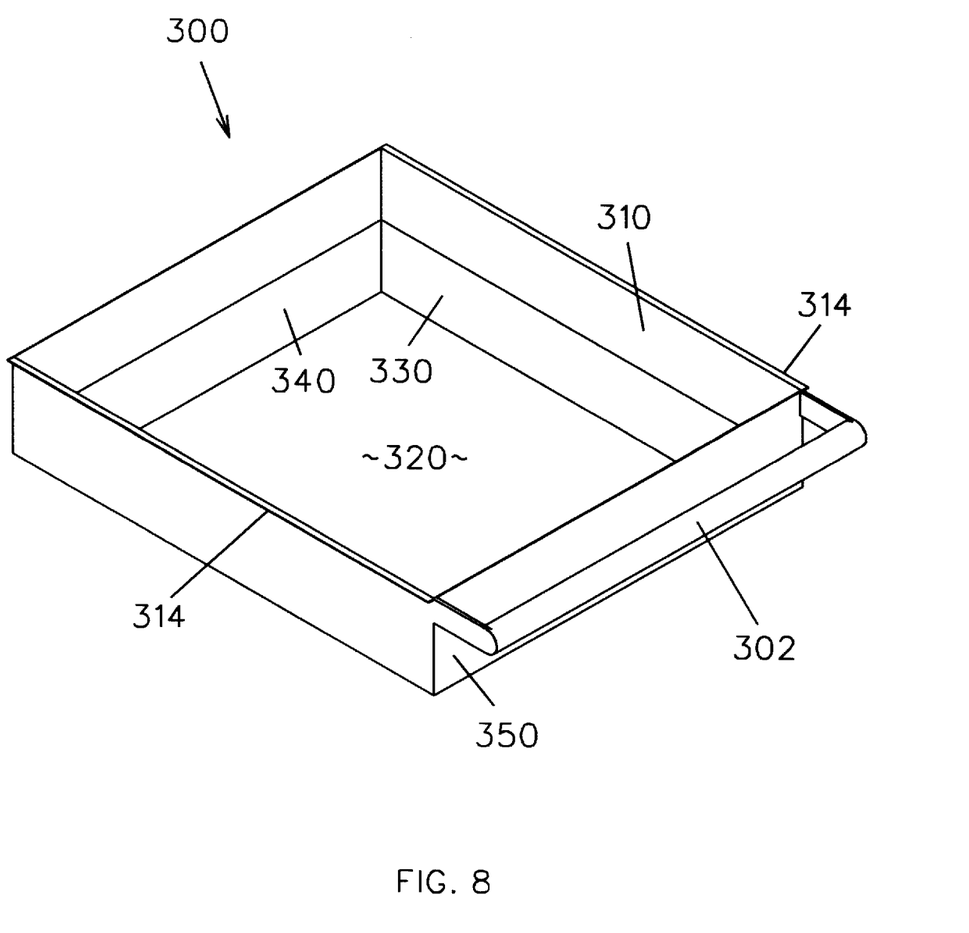
FIG. 8 is a perspective view of the loading drawer.
Figure 9A:
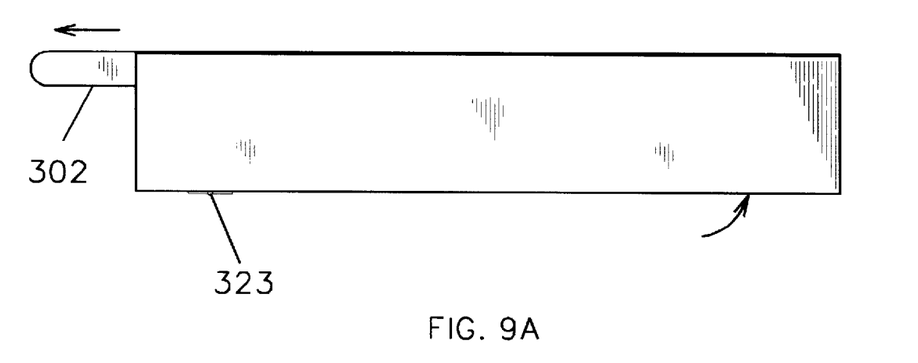
FIG. 9A is a side view of the FIG. 8 loading drawer with the base in a closed position.
Figure 9B:
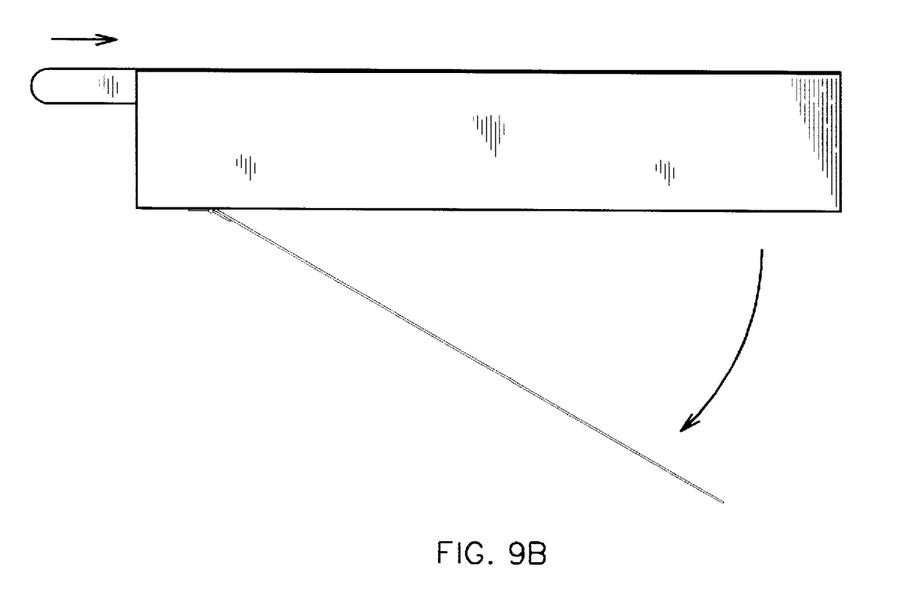
FIG. 9B is a side view of the FIG. 8 loading drawer with the base pivoted to an open position.
Figure 10:
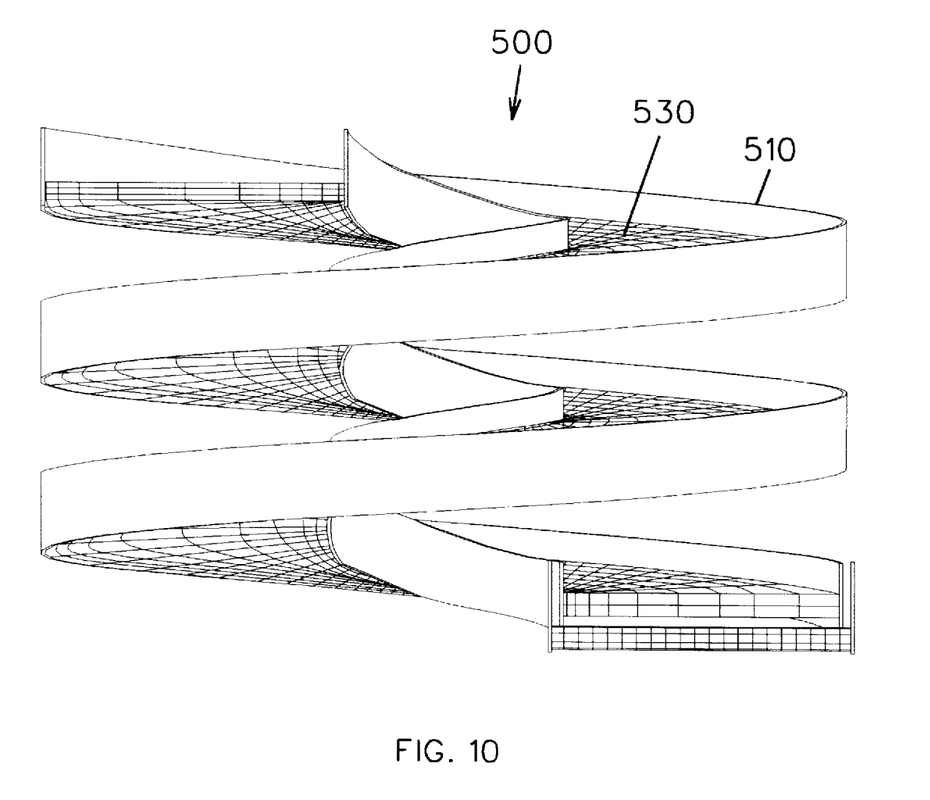
FIG. 10 is an enlarged isolated view of the spiral conveyor.
Figure 11:
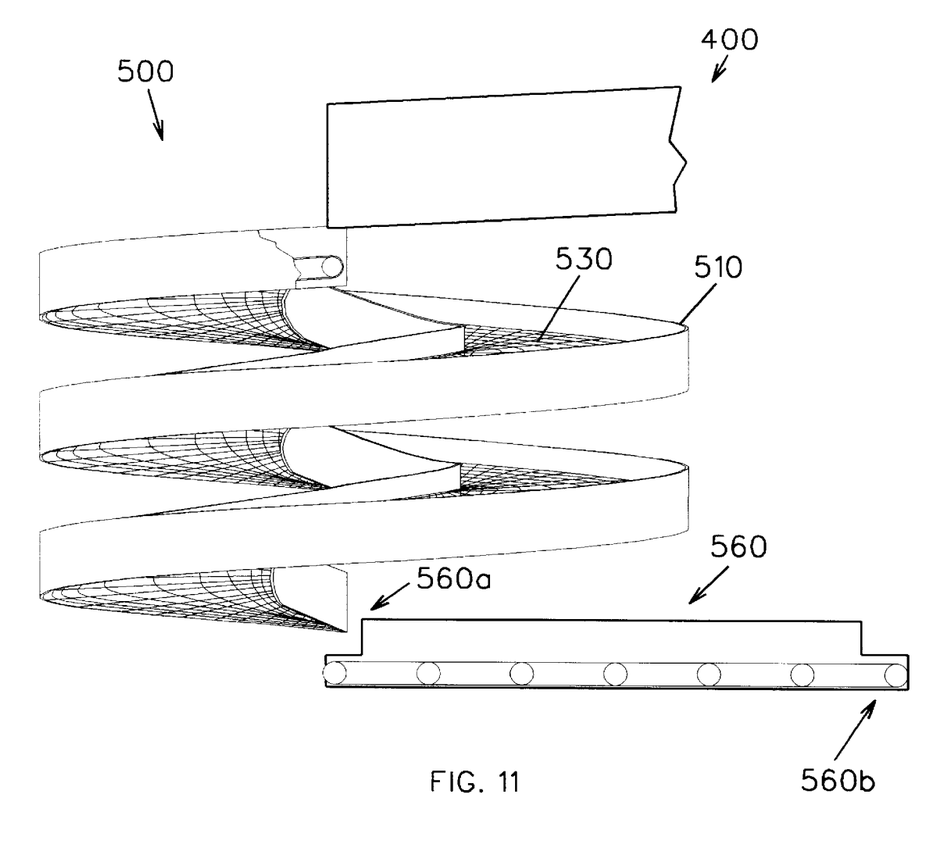
FIG. 11 is an enlarged view of the conveyor of FIG. 10 and showing the second conveyor.

The oven 100 further includes a drawer 300 (FIG. 8) by which food products are loaded into the oven for eventual cooking. The drawer 300 includes upper side wall portions 310 having outwardly extending edges 314 normal to the upper edges 312 thereof, the outer edges 314 bearing on rollers 316 (FIG. 4) for slidable insertion of the drawer 300 into the oven 100. The drawer 300 further includes a bottom panel 320 hingedly 323 attached to the lower edge of a front panel 350. A handle 302 is fixedly attached to the front panel 350 whereby the drawer 300 may be placed in an open position for loading food products therein, the bottom panel 320 remaining in a horizontal position supported by a set of rollers 322 mounted on frame 325 during loading. When the drawer is loaded and inserted into the oven 100, the bottom panel 320 once it is free of the underlying support of rollers 322 downwardly pivots (FIG. 9B) about its hinge axis, thus depositing the food products onto a loading bin 400 therebelow. When the drawer 300 is withdrawn the rollers 322 will bear against panel 320 causing the panel 320 to pivot to its FIG. 9A position. The hinges may be of the spring-type such that the bottom panel 320 returns to its horizontal position in the drawer when the weight of the food products thereon has been eliminated. The drawer 300 further includes inwardly inclined lower side and rear wall portions 330, 340 which guide the food products toward the loading bin 400 when the bottom panel 320 pivots downward to its deposit position. Similarly, a rectangular plate 360 is interiorly fixedly attached to the rear panel 130 of the housing 110, the plate downwardly angularly extending between the drawer 300 and loading bin 400 for guiding food products accurately into the bin.

Figure 3:
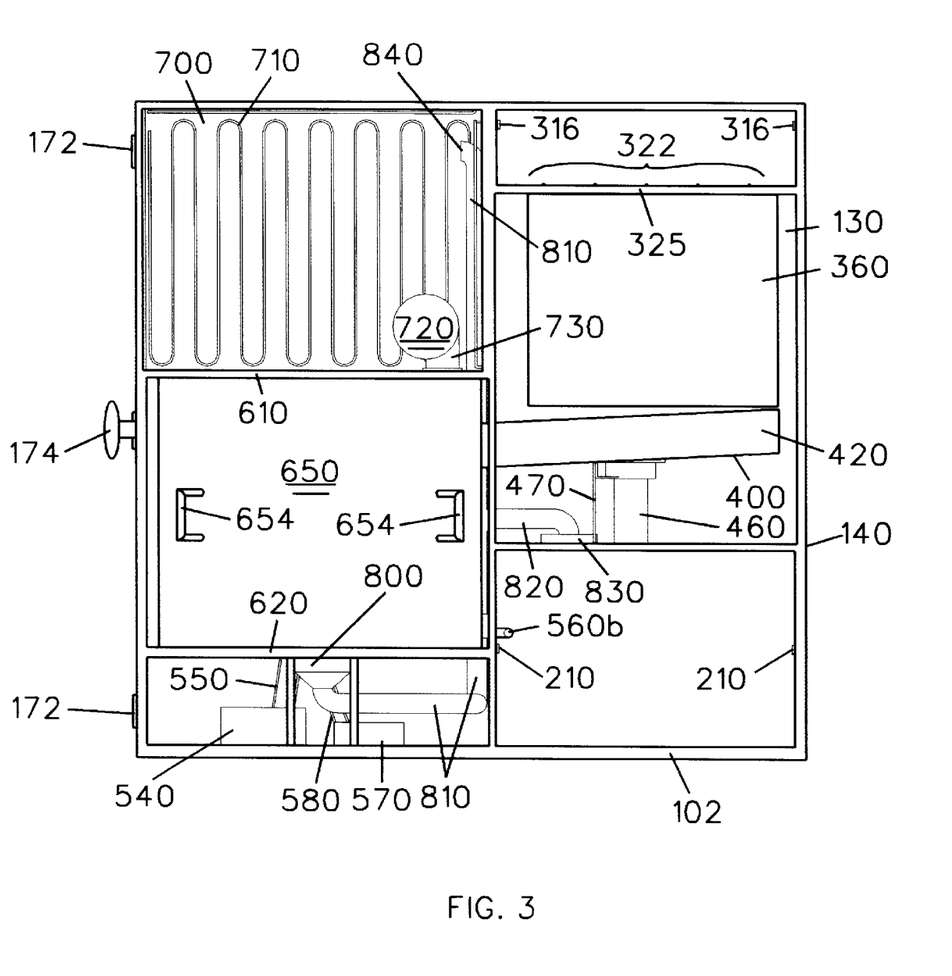
FIG. 3 is a front view of the oven of FIG. 1 with the front panel removed.

As shown in FIGS. 3, 4, and 5, the loading bin 400 comprises a generally rectangular bottom wall 410 normal to upstanding front 420, rear 430, right 440 and left 450 side walls. The left side wall 450 (FIG. 5) is integrally attached to the rear wall 430 and extends therefrom partially toward front wall 420, the bottom wall 410 extending through the opening presented between front and left side walls to a point in communication with a conveyor assembly 500. The loading bin 400 is angularly mounted upon a support member 470 and bears against a vibration device 460 such that food products falling into the bin are distributed about the bin wall 140 and transferred to the conveyor assembly 500.

The conveyor assembly 500 comprises a descending spiral ramp 510 mounted to support members 520 with a conveyor belt 530 providing a ramp floor, the belt 530 preferably being made of a wire mesh material. It is understood that spiral conveyor systems are known in the art. The conveyor belt 530 is driven by a motor 540 with a drive belt 550 for transporting food products from the loading bin 400 to a second conveyor 560 (FIG. 4). The second conveyor 560 is a conventional straight line conveyor driven by an intake motor 570 with a drive belt 580. The second conveyor has a first intake end 560*a* (FIG. 4) in communication with the bottom of the spiral ramp 500 and a second deposit end 560*b* within bin 200 for transporting food products from the spiral conveyor 500 to the storage bin 200. The spiral configuration extends the distance and prolongs the travel time for the product along the ramp.

Figure 7:
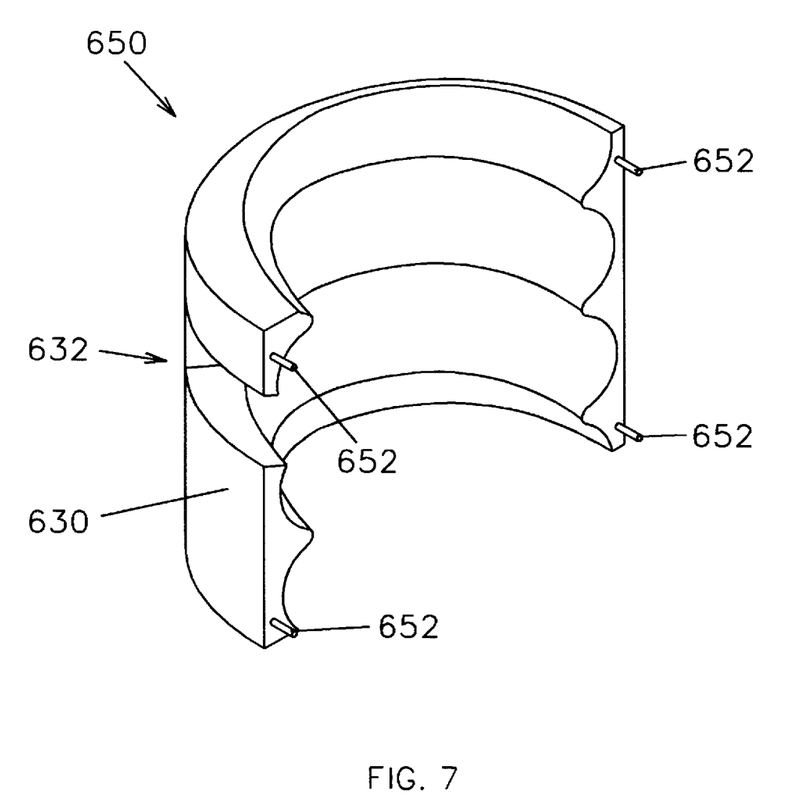
FIG. 7 is a perspective view of the front portion of the cylindrical housing.

The spiral conveyor assembly 500 is completely encased within a cylindrical housing 600. Top and bottom sides of the housing 600 are formed by upper and lower frame partitions 610, 620 (FIG. 3) to which the housing 600 is fixedly attached. The housing 600 further presents an aperture 632 in the side wall 630 thereof (FIG. 7) for receiving the deposit end of the bottom wall 410 of the loading bin 400 therethrough such that food products may be delivered to the conveyor assembly 500 therein (FIG. 7).

The housing 600 further comprises a hemispherical rear portion 640 fixedly attached to the frame structure 102 and a complementary front portion 650 which is removably attached to the rear portion 640. As more particularly shown in FIGS. 4 and 7, the rear portion 640 presents apertures 642 for insertably receiving mating pins/flanges 652 integrally attached to front portion 650 (FIG. 7). The front portion 650 may therefore be removed to facilitate cleaning or maintenance of the conveyor assembly 500 by pulling on handles 654 fixedly attached to the exterior side of the front portion (FIG. 3).

The oven 100 further comprises an insulated plenum 700 (FIG. 4) or hot air chamber having electrical heating elements 710 attached to the rear panel 130 therein, it being understood that electrical heating elements are known (FIGS. 4 and 5). Obviously, other methods of heat generation may be employed as well. A blower 720 is fixedly mounted within the plenum 700 which forces heated air through a tube 730, the tube downwardly extending through the upper partition 610 and into the housing 600. As heated air flows from an outlet end 740 of the tube 730, a downward spiral or vortex is created within the threaded/spiral housing 600 which quickly and completely surrounds the food products, thus speeding heat penetration. Also, the extended distance and time travel of the food path along the ramp between the upper and lower ends assures a complete heat interaction with the food product.

A fan assembly 800 (FIG. 4) is fixedly mounted within an aperture presented in the lower partition 620 which causes suction of heated air from the housing 600 into a recirculation tube 810 fixedly attached thereto and extending therebelow. The suction causes heated air deposited from outlet 740 on top of a food product to be drawn across the top, around the sides, and then underneath the product for efficient heat penetration and cooking. A portion of the collected air is diverted from the recirculation tube 810 into a secondary tube 820 having an outlet end 830 in open communication with the storage bin 200 for maintaining the warmth of baked food products therein. The remainder of the heated air within the recirculation tube 810 flows through an outlet end 840 (FIG. 3) thereof into the plenum 700 for recirculation through the conveyor assembly 500.

Accordingly, it can be seen that the oven of the present invention can quickly and efficiently bake food products by enveloping the food products with a vortex of heated air as they are transported on a spiral conveyor 500. The oven further provides efficient baking through use of a wire mesh conveyor and through suction of the heated air.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A bake oven comprising:
   a housing;
   a drawer slidable in and out of said housing, said drawer including:
   a bottom wall;
   means for pivotally mounting said bottom wall to said drawer between a first position wherein said drawer is in a position adapted for retaining a food product therein and a second position wherein said drawer is at a position adapted to discharge the food product from said drawer to an area therebelow;
   a first ramp within said housing, said ramp having a first end at said area below said drawer and a second end, said ramp adapted for providing a course for food product discharged thereon from said drawer;
   a second spiral ramp having an upper end and lower end within said housing, said spiral ramp upper end in communication with said lower end of said first ramp for receiving food product from said first ramp, said spiral ramp adapted for directing the food product from said upper end to said lower end for discharge;
   a compartment including a heat source within said housing;
   means for directing heat from said heat source compartment about said spiral ramp for a heat transfer with food product thereon;
   a storage bin within said housing;
   means for conveying the food product from the lower end of said spiral ramp to said storage bin for discharge therein.

2. The bake oven as claimed in claim 1 further comprising a first means for urging the food product on said first ramp from said first end to said second end for discharge onto said spiral ramp.

3. The bake oven as claimed in claim 2 wherein said first urging means comprises means for vibrating said first ramp, said vibrating means urging the food product between said first and second ends of said first ramp.

4. The bake oven as claimed in claim 1 further comprising means for urging the food product between said upper and lower ends of said spiral ramp.

5. The bake oven as claimed in claim 4 wherein said spiral ramp urging means comprises a conveyor belt assembly for driving a conveyor belt therein, said conveyor belt forming a support surface in said spiral ramp for the food product between said upper and lower ends, a driving of said conveyor belt urging the food product between said upper and lower ends of said spiral ramp.

6. The bake oven as claimed in claim 3 further comprising means for urging the food product between said upper and lower ends of said spiral ramp.

7. The bake oven as claimed in claim 6 wherein said spiral ramp urging means comprises a conveyor belt assembly for driving a conveyor belt therein, said conveyor belt forming a support surface in said spiral ramp for the food product between said upper and lower ends, a driving of said conveyor belt urging the food product between said upper and lower ends of said spiral ramp.

8. The bake oven as claimed in claim 1 wherein said heat directing means comprises:
   a conduit having a first end in the heat source compartment and a second end adjacent said spiral ramp;
   means in said housing for urging heat from the heat source compartment into said first conduit end for discharge from said second conduit end and onto said spiral ramp;
   means in said housing for drawing heat from said second conduit end and about said spiral ramp for a heat transfer with the food product thereon.

9. The bake oven as claimed in claim 6 wherein said heat directing means comprises:
   a conduit having a first end in the heat source compartment and a second end adjacent said spiral ramp;
   means in said housing for urging heat from the heat source into said first conduit end for discharge from said second conduit end and onto said spiral ramp;
   means in said housing for drawing heat from said second conduit end and about said spiral ramp for a heat transfer with the food product thereon.

10. The bake oven as claimed in claim 1 wherein said conveying means comprises a conveyor belt assembly for driving a conveyor belt therein, said belt of said conveying means having a first end adjacent said lower end of said spiral ramp and a second end adjacent said storage bin, a driving of said belt conveying the food product discharged from said lower end of said spiral ramp to said bin.

11. The bake oven as claimed in claim 9 wherein said conveying means comprises a conveyor belt assembly for driving a conveyor belt therein, said belt of said conveying means having a first end adjacent said lower end of said spiral ramp and a second end adjacent said storage bin, a driving of said belt conveying the food product discharged from said lower end of said spiral ramp to said bin.

12. The bake oven as claimed in claim 1 further comprising a first conduit extending between said spiral ramp and said storage bin for directing a portion of the heat about said spiral ramp to said storage bin for a heat exchange with the food product therein.

13. The bake oven as claimed in claim 11 further comprising a first conduit extending between said spiral ramp and said storage bin for directing a portion of the heat about said spiral ramp to said storage bin for a heat exchange with the food product therein.

14. The bake oven as claimed in claim 1 further comprising a second conduit extending between said spiral ramp and said heat source compartment for directing a portion of the heat about said spiral ramp back to said heat source compartment.

15. The bake oven as claimed in claim 13 further comprising a conduit extending between said spiral ramp and said heat source compartment for directing a portion of the heat about said spiral ramp back to said heat source compartment.

16. The bake oven as claimed in claim 1 further comprising:
- a housing for said spiral ramp;
- an interior surface in said spiral ramp housing surrounding said spiral ramp;
- a spiral configuration along said interior surface;
- an upper inlet end in said spiral ramp housing for receiving the heat from said directing means;
- a lower outlet end for said heat in said spiral ramp housing, said interior surface configuration whirling the heat about said spiral ramp housing and about said spiral ramp to enhance said heat transfer with the food product on said spiral ramp.

17. A bake oven comprising:
- a housing;
- a drawer slidable in and out of said housing, said drawer including a bottom wall having a first position wherein said wall is in a position adapted for retaining a food product therein and a second position wherein said wall is adapted to discharge the product from said drawer to an area therebelow;
- first means for conveying the food product discharged from said drawer from said area below said drawer to a discharge area spaced downstream therefrom;
- second means for conveying the food product from said discharge area of said first conveying means to a second downstream discharge area;
- a compartment within said housing including a heat source;
- means for directing heat from said heat source about said second conveying means for a heat transfer with the food product thereon;
- a storage bin within said housing;
- third means for conveying the food product from said discharge area of said second conveying means to said storage bin.

18. The bake oven as claimed in claim 17 wherein said heat directing means comprises:
- a first blower means in said heat source compartment;
- a conduit having a first end in communication with said heat source, said first blower means directing heat from said heat source into said conduit first end, said conduit having a second end adjacent said second conveying means;
- a second blower means adjacent said second discharge area for drawing the heat from said second conduit end and along said second conveying means.

19. The bake oven as claimed in claim 18 further comprising a second conduit having a first end adjacent said second blower means and a second end adjacent said storage bin, said second conduit directing a portion of the heat to said storage bin.

20. The bake oven as claimed in claim 19 further comprising a third conduit having a first end adjacent said second blower means and a second end in said heat source compartment for returning a portion of the heat along said second conveying means to said heat source compartment.

21. A bake oven comprising:
- a housing;
- means in said housing for storing food product therein in a first mode and a second mode for discharging the food product to an area therebelow;
- a first ramp within said housing, said ramp having an upstream end at said area below said storing means and a downstream end, said ramp adapted for providing a course for food product discharged thereon from said storing means;
- a second ramp having an upstream end and a downstream end within said housing for providing a course for food product discharged onto said second ramp from said downstream end of said first ramp, said upstream end of said second ramp adjacent said downstream end of said first ramp for receiving food product from said first ramp, said second ramp configured for directing the food product from said upstream end to said second ramp downstream end;
- a heat source in said housing;
- means for directing heat from said heat source along said food product course of said second ramp for a heat transfer with the food product thereon;
- a storage compartment within said housing;
- means for conveying the food product from said downstream end of said second ramp to said storage compartment.

22. The bake oven as claimed in claim 21 further comprising:
- a housing for said second ramp;
- a spiral configuration about an interior of said housing;
- an air inlet in said second ramp housing adjacent said upstream end of said second ramp for receiving heat from said directing means;
- an air outlet in said second ramp housing adjacent said downstream end of said second ramp for discharge of heat from said second ramp housing, said spiral configuration whirling the heat about the second ramp housing to enhance said heat transfer with the food product on said second ramp.

23. The bake oven as claimed in claim 22 wherein said second ramp is spiral in configuration to enhance said heat transfer.

* * * * *